(12) United States Patent
Engelsen

(10) Patent No.: US 8,672,682 B2
(45) Date of Patent: Mar. 18, 2014

(54) CONVERSION OF ALPHABETIC WORDS INTO A PLURALITY OF INDEPENDENT SPELLINGS

(76) Inventor: Howard A. Engelsen, Palm Beach Gardens, FL (US)

(*) Notice: Subject to any disclaimer, the term of this patent is extended or adjusted under 35 U.S.C. 154(b) by 202 days.

(21) Appl. No.: 13/277,715

(22) Filed: Oct. 20, 2011

(65) Prior Publication Data

US 2012/0035909 A1  Feb. 9, 2012

Related U.S. Application Data

(63) Continuation-in-part of application No. 11/536,272, filed on Sep. 28, 2006, now abandoned.

(51) Int. Cl.
| | |
|---|---|
| G06F 17/20 | (2006.01) |
| G06F 17/28 | (2006.01) |
| G06F 17/27 | (2006.01) |
| G10L 21/00 | (2013.01) |
| G09B 1/00 | (2006.01) |
| G09B 5/00 | (2006.01) |
| G09B 19/00 | (2006.01) |
| G09B 17/00 | (2006.01) |

(52) U.S. Cl.
USPC ............ 434/178; 704/1; 704/2; 704/7; 704/8; 704/9; 704/272; 704/275; 704/277; 434/112; 434/156; 434/159; 434/160; 434/161; 434/167; 434/169; 434/170; 434/172; 434/176

(58) Field of Classification Search
USPC ............ 704/1, 2, 7, 8, 9, 271, 277, 272, 275; 434/112, 156, 159, 160, 161, 167, 169, 434/170, 172, 176, 178
See application file for complete search history.

(56) References Cited

U.S. PATENT DOCUMENTS

| 78,296 A | 5/1868 | Leigh |
|---|---|---|
| 146,631 A | 5/1873 | Allen |

(Continued)

FOREIGN PATENT DOCUMENTS

| GB | 2050034 A | 12/1980 |
|---|---|---|
| WO | 0060560 | 10/2000 |

OTHER PUBLICATIONS

Engelsen, H., "Reading made simple with Engelese," [online] http://engelese.com, Jan. 25, 2005 [retrieved Apr. 13, 2009] retrieved from the Internet: <http://web.archive.org/web/20050123141838/http://engelese.com/>, 2 pgs.

(Continued)

*Primary Examiner* — Paras D Shah
(74) *Attorney, Agent, or Firm* — Cuenot, Forsythe & Kim, LLC

(57) ABSTRACT

A method of automatically converting alphabetic text written in a text based language into a non-text based language. The method can include parsing the text to identify at least one word. The method also can include via a processor, identifying within a lexicon database data corresponding to the word, wherein the data corresponding to the word identifies at least one pictograph or symbol selected from a group of pictographs or symbols consisting of between twenty seven and thirty three distinct pictographs or symbols that visually look different than the text, wherein each pictograph or symbol corresponds to a unique speech sound of the text based language. The pictograph or symbol can be rendered in a view.

16 Claims, 6 Drawing Sheets

(56) References Cited

U.S. PATENT DOCUMENTS

| | | | |
|---|---|---|---|
| 395,120 A | 12/1888 | Campbell | |
| 1,584,627 A | 5/1926 | Marino | |
| 3,121,960 A | 2/1964 | Uttal et al. | |
| 3,426,451 A | 2/1969 | Hoffman | |
| 3,715,812 A | 2/1973 | Novak | |
| 4,007,548 A | 2/1977 | Cytanovich | |
| 4,151,659 A | 5/1979 | Lien et al. | |
| D255,804 S | 7/1980 | James | |
| 4,609,357 A | 9/1986 | Clegg | |
| 4,655,713 A | 4/1987 | Weiss | |
| 4,713,008 A | 12/1987 | Stocker et al. | |
| 5,057,020 A | 10/1991 | Cytanovich | |
| 5,306,153 A | 4/1994 | Foster | |
| 5,429,513 A | 7/1995 | Diaz-Plaza | |
| 5,556,282 A | 9/1996 | Middlebrook | |
| 5,562,453 A * | 10/1996 | Wen | 434/185 |
| 5,713,740 A | 2/1998 | Middlebrook | |
| 5,743,740 A * | 4/1998 | Visser et al. | 434/128 |
| 5,788,503 A | 8/1998 | Shapiro et al. | |
| 6,009,397 A | 12/1999 | Siegel | |
| 6,022,222 A | 2/2000 | Guinan | |
| 6,045,363 A | 4/2000 | Phillips | |
| 6,077,080 A | 6/2000 | Rai | |
| 6,186,794 B1 * | 2/2001 | Brown et al. | 434/116 |
| 6,343,935 B1 * | 2/2002 | Clements | 434/156 |
| 6,442,524 B1 | 8/2002 | Ecker et al. | |
| D478,931 S | 8/2003 | Leu | |
| 6,604,947 B1 | 8/2003 | Rai | |
| 6,683,611 B1 | 1/2004 | Cleveland | |
| 6,690,356 B2 | 2/2004 | Johnston, Jr. et al. | |
| 6,732,076 B2 * | 5/2004 | Masterson et al. | 704/254 |
| 6,796,798 B1 | 9/2004 | Sanocki | |
| 6,824,388 B2 * | 11/2004 | Goodfriend | 434/178 |
| 6,869,286 B2 | 3/2005 | Furry | |
| 6,884,075 B1 | 4/2005 | Tropoloc | |
| 6,950,986 B1 | 9/2005 | Jacobi et al. | |
| 6,951,464 B2 | 10/2005 | Cubeta et al. | |
| 7,011,525 B2 | 3/2006 | Mejia | |
| 7,367,807 B1 * | 5/2008 | Pennebaker | 434/167 |
| 7,581,956 B2 | 9/2009 | Lusk et al. | |
| 7,792,785 B2 | 9/2010 | Clark et al. | |
| 2002/0098463 A1 | 7/2002 | Fiedorowicz et al. | |
| 2002/0146669 A1 | 10/2002 | Bender | |
| 2002/0150869 A1 * | 10/2002 | Shpiro | 434/156 |
| 2003/0170595 A1 | 9/2003 | Thompson | |
| 2003/0223096 A1 | 12/2003 | Kogod et al. | |
| 2004/0115598 A1 * | 6/2004 | Goodfriend | 434/159 |
| 2004/0175679 A1 * | 9/2004 | Wasowicz et al. | 434/178 |
| 2005/0048450 A1 | 3/2005 | Winkler | |
| 2005/0060138 A1 | 3/2005 | Wang et al. | |
| 2005/0069848 A1 | 3/2005 | Cytanovich | |
| 2005/0069849 A1 * | 3/2005 | McKinney et al. | 434/178 |
| 2005/0191603 A1 * | 9/2005 | Budra et al. | 434/178 |
| 2006/0040242 A1 | 2/2006 | Meija | |
| 2006/0088805 A1 | 4/2006 | Pitkethly | |
| 2007/0105073 A1 * | 5/2007 | Kullok et al. | 434/169 |
| 2007/0172810 A1 * | 7/2007 | McCallum et al. | 434/353 |
| 2007/0184417 A1 * | 8/2007 | Litten | 434/156 |
| 2007/0218432 A1 * | 9/2007 | Glass et al. | 434/156 |
| 2008/0096171 A1 * | 4/2008 | Movahhedi | 434/178 |
| 2008/0140411 A1 * | 6/2008 | Millman et al. | 704/270 |
| 2008/0170788 A1 | 7/2008 | Guo | |
| 2008/0183460 A1 * | 7/2008 | Baker et al. | 704/3 |
| 2009/0007468 A1 * | 1/2009 | Smith | 40/124.01 |
| 2011/0104646 A1 * | 5/2011 | Harte | 434/167 |
| 2011/0306023 A1 * | 12/2011 | Blank et al. | 434/178 |

OTHER PUBLICATIONS

Engelsen, H., "Engelese—The Natural Path to Reading!" [online] http://engelese.com, 2004 [retrieved Sep. 18, 2008] retrieved from the Internet: <http://web.archive.org/web/*/http://engelese.com/> 7 pgs.

\* cited by examiner

| Entity/Action Represented by Symbol | Alphabet Letter to Which Symbol Corresponds | Letter Attributes |
|---|---|---|
| boot | b | 2+5 |
| duck | d | 2+6 |
| flower | f | 2+7+1 |
| glasses | f | 5+6+1 |
| horse | h | 2+7+2 |
| jump | j | 2+8+9 |
| kick | k | 2+3+4 |
| leg | l | 2 |
| mouse | m | 2+7+2+7+2 |
| needle | n | 2+7+2 |
| pot | p | 2+5 |
| rabbit | r | 2+7 |
| snake | s | 5+6 |
| tie | t | 2+1 |
| vest | v | 4+3 |
| worm | w | 4+3+4+3 |
| yell | y | 4+3 |
| zipper | z | 1+3+1 |

CONVERSION OF ALPHABETIC WORDS INTO A PLURALITY OF INDEPENDENT SPELLINGS

CROSS REFERENCES TO RELATED APPLICATIONS

This application is a Continuation-in-Part of U.S. patent application Ser. No. 11/536,272, filed Sep. 28, 2006, which is herein incorporated by reference.

BACKGROUND OF THE INVENTION

For a typical child, the process of learning to read and write usually begins during the pre-school years or kindergarten. Using conventional teaching methods, a child initially learns to identify the letters of the alphabet. Then, beginning with short two and three letter words, the child is taught to string together the sounds of the letters to identify words. Once the child has become proficient at reading short words, the process can be expanded to teach the child to sound out and spell longer words, eventually leading to reading and writing. Unfortunately, teaching a child to read and write using conventional methods can be a lengthy process. It is not until about the third grade that a typical child becomes relatively proficient at reading.

Graphic objects that are recognizable to children are sometimes used to facilitate the learning process. For example, a pictograph of an apple can be associated with the letter "a," a pictograph of an egg can be associated with the letter "e," and a pictograph of an umbrella can be associated with the letter "u." To generate learning materials that include such pictographs can be very costly, however, due to the complexity in correctly associating the pictographs with the letters. Indeed, such processes are typically performed quasi-manually using a graphics application and can be very labor intensive.

SUMMARY OF THE INVENTION

The present invention relates to a method of automatically converting alphabetic text written in a text based language into a non-text based language. The method can include parsing the text to identify at least one word. The method also can include via a processor, identifying within a lexicon database data corresponding to the word, wherein the data corresponding to the word identifies at least one pictograph selected from a group of pictographs consisting of between twenty seven and thirty three distinct pictographs that visually look different than the text, wherein each pictograph in the group of pictographs corresponds to a unique speech sound of the text based language. The at least one pictograph can be rendered in a view.

In another embodiment, the method can include parsing the text to identify at least one word. The method also can include via a processor, identifying within a lexicon database data corresponding to the word, wherein the data corresponding to the word identifies at least one symbol selected from a group of symbols consisting of between twenty seven and thirty three distinct symbols that visually look different than the text, wherein each symbol in the group of symbols corresponds to a unique speech sound of the text based language. The at least one symbol can be rendered in a view.

In another embodiment, the method can include identifying a reading level of a person. When the reading level of the person is below a threshold level, the method can include, via a processor, identifying within a lexicon database data corresponding to the word, wherein the data corresponding to the word identifies at least one pictograph selected from a group of pictographs that visually look different than the text, wherein each pictograph in the group of pictographs corresponds to a unique speech sound of the text based language. The at least one pictograph can be rendered in a view.

When the reading level of the person is at least equal to the threshold level, the method can include parsing the text to identify at least one word. The method further can include, via the processor, identifying within the lexicon database data corresponding to the word, wherein the data corresponding to the word identifies at least one symbol selected from a group of symbols that visually look different than the text, wherein each symbol in the group of symbols corresponds to a unique speech sound of the text based language. The at least one symbol can be rendered in the view.

Another embodiment of the present invention can include a computer program product for converting alphabetic text written in a text based language into a non-text based language. The computer program product can include a computer-readable storage device having computer-readable program code embodied therewith, the computer-readable program code including computer-readable program code configured to perform the various operations and/or functions disclosed within this specification.

BRIEF DESCRIPTION OF THE DRAWINGS

Preferred embodiments of the present invention will be described below in more detail, with reference to the accompanying drawings, in which:

FIG. 6 depicts a group of symbols corresponding to unique speech sounds that are useful for understanding the present invention;

DETAILED DESCRIPTION

Figure 1:
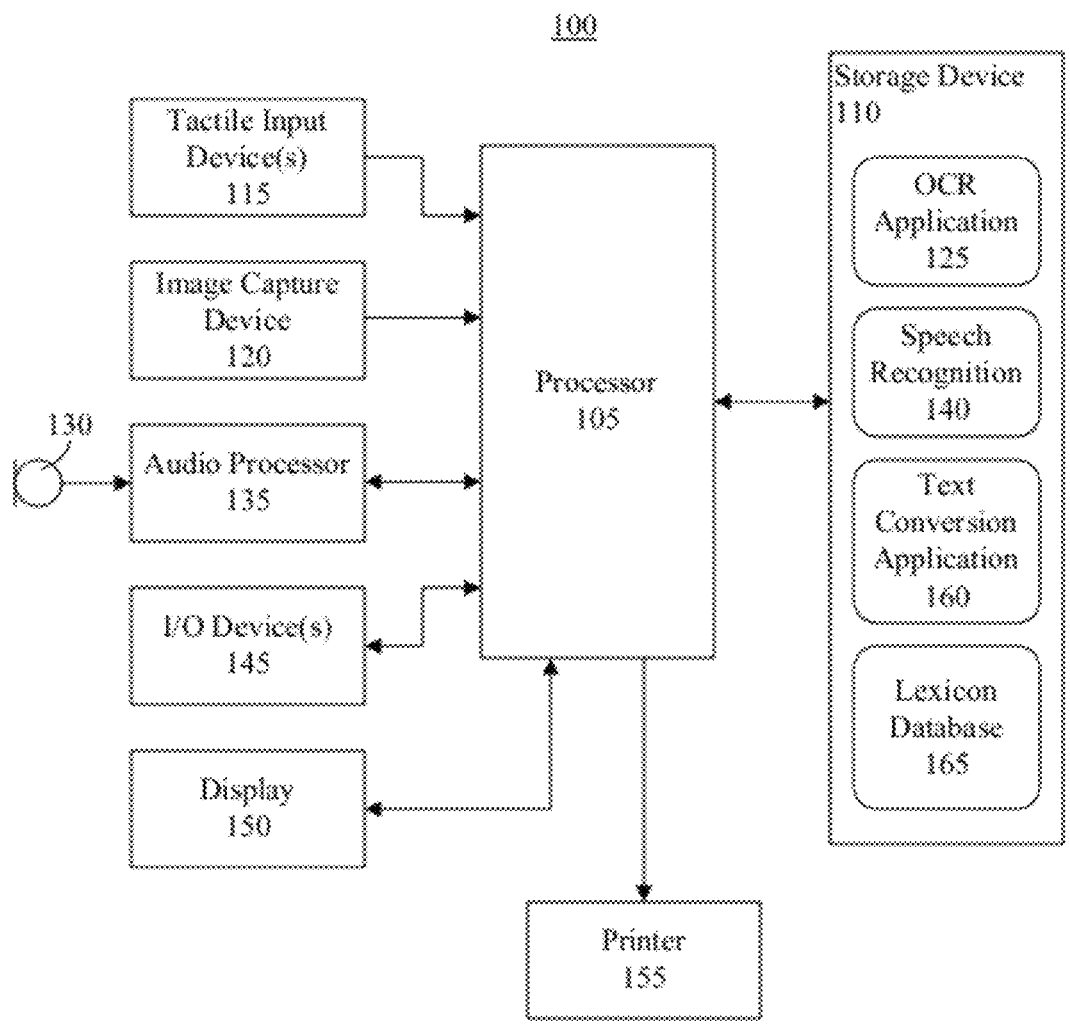
FIG. 1 depicts a textual conversion system that is useful for understanding the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage device. A computer-readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage device would include the following: a portable computer diskette, a hard disk drive (HDD), a solid state drive (SSD), a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage device may be any non-transitory storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage device and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustration and/or block diagrams, and combinations of blocks in the flowchart illustration and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Arrangements described herein relate to a method and a system for teaching people (e.g., children) how to read. Specifically, alphabetic text written in a text based language, such as English, can be converted into a non-text based language, for example a pictograph based language, to facilitate recognition of unique speech sounds by a reader. As the reader progresses with understanding of the unique speech sounds, a reading level can be assigned to the reader. When the reading level of the reader reaches a threshold value, the alphabetic text written in the text based language can be converted into a symbol based language. Symbols in the symbol based language can include visual attributes of corresponding alphabet letters (hereinafter "letters") in the text based language, while also including visual attributes of corresponding to pictographs, thereby facilitating the transition from reading the pictograph based language to reading the text based language.

FIG. 1 depicts a textual conversion system (hereinafter "system") 100 that is useful for understanding the present invention. The system 100 can be embodied as a computer (e.g. personal computer, server, workstation, mobile computer, etc.) or an application specific textual conversion device. The system 100 can include a processor 105. The processor 105 can comprise, for example, a central processing unit (CPU), a digital signal processor (DSP), an application specific integrated circuit (ASIC), a programmable logic device (PLD), a plurality of discrete components that cooperate to process data, and/or any other suitable processing device. The processor 105 can be communicatively linked to various internal and/or external devices and/or systems via a communication bus and/or one or more communication ports.

In illustration, the system 100 can include a computer-readable storage device (hereinafter "storage device") 110. The storage device 110 can include one or more data storage devices, such as any of those previously described. In one arrangement, the storage device 110 can be integrated into the processor 105, though this need not be the case.

One or more user interface devices can be provided with the system 100. For example, the system 100 can include tactile input devices 115, such as a keyboard, a mouse and/or a touchpad. The tactile input devices 115 can receive tactile user inputs to enter or select textual input containing words that are to be converted in accordance with the methods and process described herein. The textual input can be received from other devices, however, for example from the storage device 110 or from another device or system to which the system 100 is communicatively linked.

The system 100 also can include an image capture device 120, for instance a scanner. The image capture device 120 can capture images of text to be entered into the system 100 for conversion. An optical character recognition (OCR) application 125 can be provided to convert text contained in captured images into textual input. The OCR application 125 can be contained on the storage device 110 or in any other suitable storage device.

An audio input transducer (e.g. microphone) 130 also can be provided to detect acoustic signals, such as spoken utterances, and generate corresponding audio signals. The audio input transducer 130 can be communicatively linked to an audio processor 135, which can process the audio signals as required for processing by the processor 105. For example, the audio processor 135 can include an analog to digital converter (ADC) to convert an analog audio signal into a digital audio signal, and equalization components to equalize the audio signal. The audio processor 135 can forward the audio signals to the processor 105, which can execute a speech recognition application 140 to convert the audio signals into textual input.

Additional input/output (I/O) devices 145 also can be provided to receive data from, or send data to, one or more other devices or systems. Examples of such devices 145 can include, but are not limited to, a network adapter, a transceiver, and a communication port controller. Examples of a communication port include, but are not limited to, a universal serial bus (USB) port, an IEEE-1394 port, a serial communication port, a parallel communication port, an ATA port, a SATA port, and the like. Such I/O devices and communication ports can communicatively link the system 100 to another device or system. In illustration, a network adapter can communicatively link the system 100 to another device or system via a communication network such as a LAN, a wireless LAN (WLAN), a WAN, a cellular communication network, the Internet and/or any other suitable communication network.

The system 100 also can include an output device, such as display 150, in which a visual field can be presented. In one arrangement, the display 150 can be a touch screen which can receive tactile inputs to enter the textual input. In addition to, or in lieu of, the display 150, the system 100 also can include a printer 155 as an output device. The printer 155 can print the visual field onto paper or any other suitable print medium.

A text conversion application 160 can be contained on the storage device 110. The text conversion application 160 can be executed by the processor 105 to implement the methods and process described herein. For example, the text conversion application 160 can receive textual input from the tactile input devices 115, the OCR application 125, the speech recognition application 140, the input/output devices 145, the display 150 or any other device suitable for providing textual input. The text conversion application 160 then can process the textual input to identify words contained in the textual input and convert such words into a plurality of word objects. The word objects then can be communicated to the input/output devices 145, the display 150 and/or the printer 155 for presentation in a visual field. In particular, word objects that correlate to a particular word can be presented in a manner in which they are visually associated.

A lexicon database 165 also can be contained on the storage device 110. The lexicon database can include data corresponding to various words of a text based language, such as English. The text conversion application 160 can access the lexicon database 165 when processing the textual input to convert words contained in the textual input into the word objects.

The data can correlate the words with word objects that themselves contain phonetic objects, such as pictographs or symbols. In illustration, each word in the text based language can represent one or more unique speech sounds, and the word objects to which the words are correlated can contain phonetic objects representing those same unique speech sounds. For example, each word of the text based language can be correlated to word objects containing pictographs ("pictograph word objects") and to word objects containing symbols ("symbol word objects"). Thus, each corresponding pictograph word object can contain one or more pictographs corresponding to those same unique speech sounds, and each corresponding symbol word object can contain one or more symbols corresponding to those same unique sounds. The pictograph word objects and symbol word objects collectively will be referred to herein as "phonetic word objects."

The data also can correlate the words with word objects containing corresponding letters of the text based language ("letter word objects"). In other words, the letter word objects can contain the same letters as their corresponding words. However, spacing between the letters can be selectively applied so that the letters align with corresponding pictographs and/or symbols in corresponding pictograph word objects and/or symbol word objects.

Figure 2:
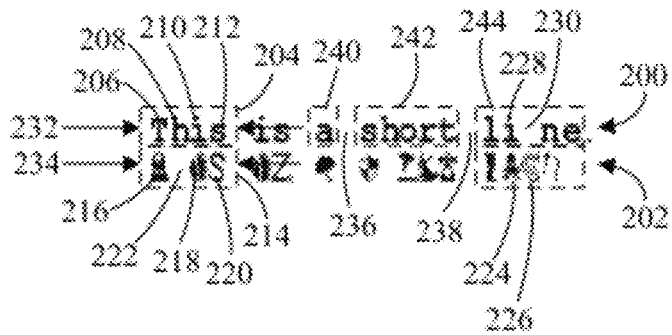
FIG. 2 depicts conversions of textual input that are useful for understanding the present invention.

FIG. 2 depicts conversions 200, 202 of textual input "This is a short line" in accordance with the inventive arrangements described herein. For each word contained in the textual input, a plurality of word objects can be generated. For instance, for the word "This," a letter word object 204 having a spelling comprising letter objects 206, 208, 210, 212 can be generated, and a phonetic word object 214 having a spelling comprising phonetic objects 216, 218, 220. The word objects 204, 214 can be rendered for presentation to a user. For example, the word objects 204, 214 can be rendered to a display or rendered in a printout generated by a printer (e.g., printed to paper or the like).

Notably, the phonetic objects 216-220 can take various forms to facilitate comprehension and the invention is not limited in this regard. In illustration, the phonetic objects 216-220 can be pictographs or symbols that visually look different than the text, but correspond to unique speech sounds represented by the text.

The phonetic word object 214 can be positioned in the visual field (e.g. on a display or in print) such that it is visually associated with the letter word object 204. For example, the phonetic word object 214 can be positioned over, under or beside the letter word object 204. Further, the phonetic objects 216, 218, 220 can be positioned so as to be associated with the letter objects 206, 208, 210, 212 to which they correlate. For example, the phonetic object 216 can correlate to the combination of the letter objects 206, 208 ("Th"), and thus can be positioned so as to convey such correlation. In the example, the phonetic object 216 is positioned directly below the letter object 206. However, the phonetic object 216 also may be positioned above or beside the letter object 206, or above, below or beside the letter object 208. Still, the phonetic object 216 can be positioned in any other manner suitable to convey the correlation between the phonetic object 216 and the letter objects 206, 208 and the invention is not limited in this regard.

The phonetic object 218 can correlate to the letter object 210 and the phonetic object 220 can correlate to the letter object 212. Accordingly, in the example, the phonetic object 218 can be positioned below the letter object 210 and the phonetic object 220 can be positioned below the letter object 212. A blank phonetic object 222 can be aligned with the letter object 208, which can indicate that the letter object 208 is to be combined with its adjacent letter object 206 for the purposes of pronunciation. In this example, the phonetic object 216 can represent the sound produced when uttering "th."

As pronounced, some words are formed using sounds that are not indicated by their conventional spelling. Nonetheless, when teaching a child to read, it can be beneficial to indicate such sounds to facilitate the child's grasp of the words. For example, the word "line" is typically pronounced by uttering two distinct sounds represented by the letter "i." Accordingly, two phonetic objects 224, 226 can be associated with the "i" letter object 228. In the word object 244, the letter object 228 can be followed by a blank letter object 230. The blank letter object 230 can indicate that both phonetic objects 224, 226 are associated with the letter object 228.

To facilitate automated conversion of input text into the conversions 200, 202, at least one physical dimension of the letter word object 204 can be substantially equivalent to at least one physical dimension of the phonetic word object 214. For example, in an arrangement in which the letter and phonetic word objects 204, 214 are vertically aligned, a width 232 of the letter word object 204 can be equal to a width 234 of the phonetic word object 214. Accordingly, as the words are parsed from the textual input to generate the letter and phonetic word objects 204, 214, such word objects 204, 214 can be sequentially positioned to form the conversions 200, 202 without the need to perform additional alignment steps. Of course, spaces 236, 238 can be inserted between adjacent word objects 240, 242, 244 to distinguish individual words.

In an alternative embodiment, a width of each of the phonetic objects 216, 218, 220 can be substantially equivalent to a width of the letter objects 206, 208, 210, 212 to which they correspond. Since the phonetic object 216 corresponds to two letter objects 206, 208, the blank phonetic object 222 can be inserted between the phonetic object 216 and the phonetic object 218, and can have a width equal to the letter object 208. In another arrangement, the width of the phonetic object 216 can be equal to the combined width of the letter objects 206, 208.

In one aspect of the inventive arrangements described herein, after individual words have been parsed from the textual input, the letter and phonetic word objects 204, 214 that correspond to the parsed words can be selected from one or more data objects, such as data files or data tables. For example, if a first word parsed from the textual input sentence is "this," the word "this" can be processed to identify and select the letter word object 204 and the phonetic word object 214. For instance, structured query language (SQL) can be implemented to generate a query to the lexicon database that performs the selection of the letter and phonetic word objects 204, 214 from the data file(s) and/or data table(s). Notwithstanding, the selection of the letter and phonetic word objects 204, 214 can be performed in any other suitable manner. Because the letter word object 204 is a first word of a sentence, a version of that word object can be selected in which its first letter "T" is capitalized. A version of the letter word object 204 also can be available in which the letter "t" is not capitalized. Such version can be selected if the parsed word is not the first word in the textual input sentence.

The plurality of word objects 204, 214 that correspond to any word can be generated to have at least one dimensional parameter that is substantially the same. For example, for a particular font size, the word objects 204, 214 that correlate to a particular word each can have the same width. The dimensional parameters can be dynamically variable based on the font size that is selected so long as such dimensional variation is applied substantially equally to each of the word objects 204, 214.

In an alternate arrangement, at least one dimensional parameter of each of the phonetic objects 216, 222, 218, 220 can be substantially equivalent to a dimensional parameter of one or more of the letter objects 206, 208, 210, 212 to which the phonetic objects 216, 222, 218, 220 correspond. For example, a width of the phonetic object 216 can be substantially the same as the width of the letter object 206, a width of the blank phonetic object 222 can be substantially the same as the width of the letter object 208, and so on. Similarly, the width of the phonetic object 224 can be substantially the same as the width of the letter object 228, and the width of the phonetic object 226 can be substantially the same as the width of the blank letter object 230. Again, the dimensional parameters can be dynamically variable based on the font size that is selected so long as such dimensional variation is applied substantially equally to each of the letter objects 206, 208, 210, 212 and their corresponding phonetic objects 216, 222, 218, 220.

In one aspect of the invention, the letter word objects 204 can be presented with visual effects that distinguish the letter word objects 204 from the phonetic word objects 214. For example, the letter objects 206, 208, 210, 212 can be presented with a font color that is different than the color in which the phonetic objects 216, 218, 220 are presented. In another arrangement, the letter objects 206, 208, 210, 212 can be presented with a font that, in comparison to the phonetic objects 216, 218, 220, contrasts less with a background of the visual field in which the letter and phonetic word objects 204, 214 are presented. For example, the letter objects 206, 208, 210, 212 can be presented in a shade of gray while the phonetic objects 216, 218, 220 are presented in black. In yet another arrangement, the word objects 204 can be underlined. Still, any other suitable effects can be applied to the letter word objects 204, the phonetic word objects 214, the letter objects 206, 208, 210, 212 and or the phonetic objects 216, 218, 220, and the invention is not limited in this regard.

In addition to the letter and phonetic word objects 204, 214, pictures, objects or symbols can be presented in the visual field. Such pictures, objects or symbols can be presented above, below, beside and/or between the letter word objects 204 and the phonetic word objects 214, or positioned in the visual field in any other suitable manner. In one arrangement, the pictures, objects or symbols can be pictorial representations of the letter and phonetic word objects 204, 214.

Figure 3:
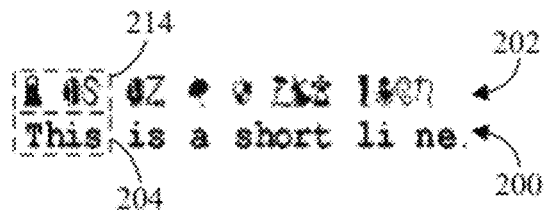
FIG. 3 depicts another arrangement of the conversions of textual input presented in FIG. 2.

FIG. 3 depicts another arrangement of the conversions of textual input presented in FIG. 2. In particular, the conversions 200, 202 of textual input are depicted in an arrangement in which the letter word objects 204 are presented below the phonetic word objects 214. Still, the letter and phonetic word objects 204, 214 can be presented in any other manner suitable for associating corresponding word objects 204, 214 and the invention is not limited in this regard.

Figure 4:
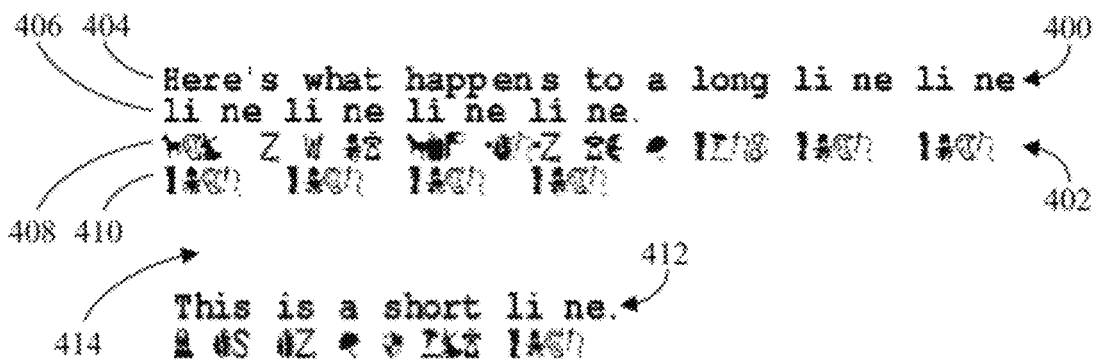
FIG. 4 depicts additional conversions of textual input that are useful for understanding the present invention.

FIG. 4 depicts additional conversions 400, 402 of textual input that are useful for understanding the present invention. When the conversion 400 of a sentence extends in length so as to require a plurality of lines 404, 406 to be displayed in the visual field in order to present the entire sentence, such lines 404, 406 can be adjacently positioned (e.g. the second line 406 can be presented immediately below the first line 404). In this arrangement, lines 408, 410 also can be adjacently positioned. Further, the group of lines 408, 410 presenting the phonetic conversion 402 of the textual input sentence can be positioned adjacently to the group of lines 404, 406, thereby indicating that the conversions 400, 402 are generated from the same textual input sentence.

A second letter object conversion 412 for a next textual input sentence can be positioned below the conversion 402, and an indicator can be provided to indicate that the second letter object conversion 412 is not associated with the conversion 402. For example, a graphic or additional blank space 414 can be provided between the second letter object conversion and the conversion 402.

Figure 5:
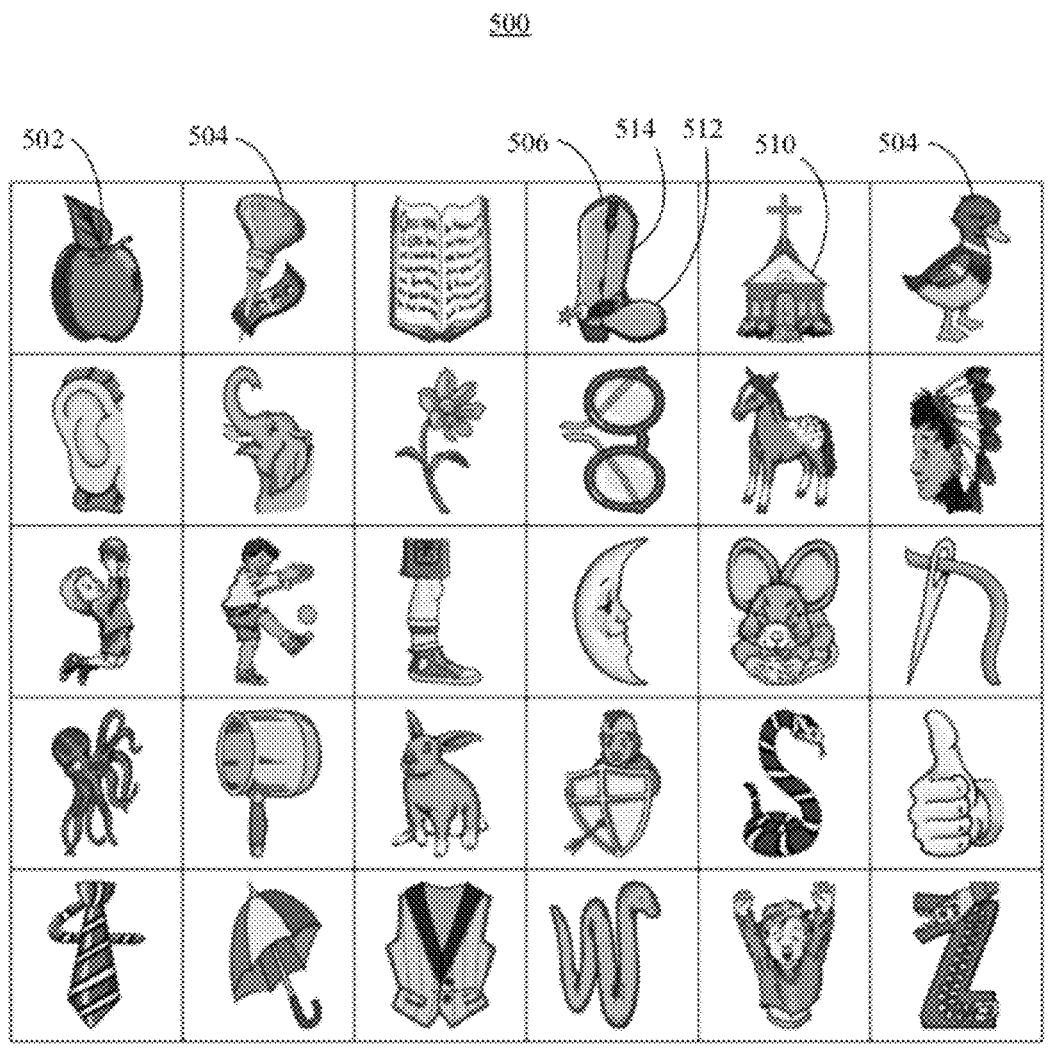
FIG. 5 depicts a group of pictographs corresponding to unique speech sounds that are useful for understanding the present invention.

FIG. 5 depicts a group of pictographs 500 corresponding to unique speech sounds that are useful for understanding the present invention. In this regard, each pictograph 500 can depict an object entity (e.g., object, animal or person) or action likely to be familiar to a person learning to read. Thus, the objects depicted can indicate to such person a unique speech sound. For example, a pictograph 502 can represent the letter "a" as pronounced in the word "apple," a pictograph 504 can represent the letter "a" as pronounced in the word "awl," a pictograph 506 can represent the letter "b" as pronounced in the word "boot," and a pictograph 508 can represent the letter "d" as pronounced in the word "duck." Some pictographs, such as the pictographs 502, 504 can represent a same letter, but represent different speech sounds associated with the letter. Further, some pictographs can represent a speech sound represented by a plurality of letters. For example, a pictograph 510 can represent the letters "ch" as pronounced in the word "church."

One or more of the pictographs 500 can include at least one visual attribute corresponding to a visual attribute of at least one respective letter of the text based language corresponding to the same unique speech sound to which the pictograph 500 corresponds. For example, the pictograph 506 depicts a boot having a lower portion 512 and a shaft 514 rising from the lower portion. The lower portion 512 of the boot can represent an attribute for the right lower portion of the letter "b." The shaft 514 of the boot can represent an attribute for the left linear portion of the letter "b."

The pictographs 500 can be used as the phonetic objects previously described to form the pictograph word objects. Specifically, for each unique speech sound in a word of the text based language, a corresponding pictograph can be selected. The group of pictographs 500 can contain between twenty seven (27) and thirty three (33) distinct pictographs. For example, the group of pictographs can contain 27 pictographs, 28 pictographs, 29 pictographs, 30 pictographs, 31 pictographs, 32 pictographs or 33 pictographs. Further, between seventeen (17) and nineteen (19) of the pictographs can correspond to consonant speech sounds. For example, the group of pictographs 500 can include 17, 18 or 19 pictographs that correspond to consonant speech sounds, as will be further described.

Figure 6:
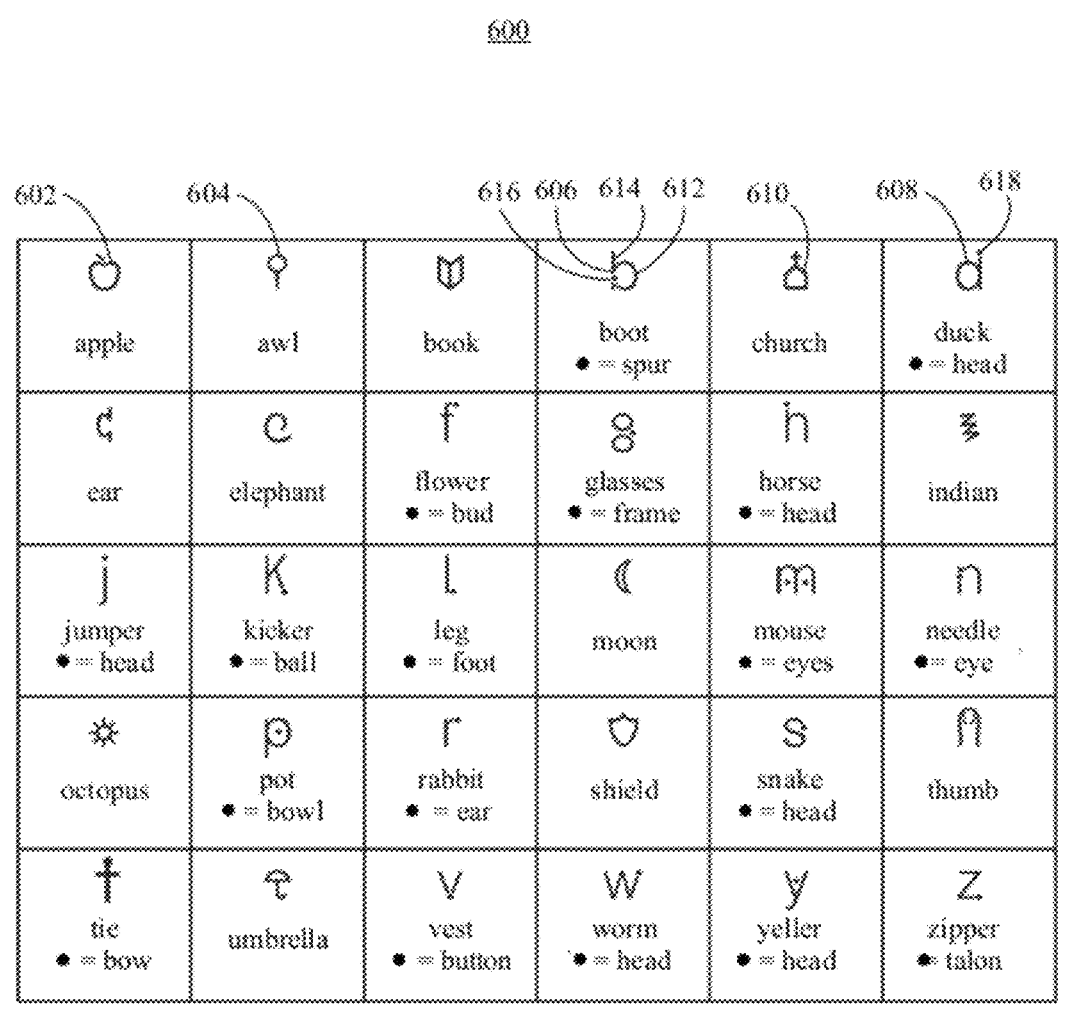

FIG. 6 depicts a group of symbols 600 corresponding to unique speech sounds that are useful for understanding the present invention. Each of the symbols 600 can correspond to a respective one of the pictographs 500 of FIG. 5. In particular, each of the symbols 600 can correspond to a same unique speech sound as a respective pictograph 500. In this regard, as depicted in FIG. 6, the symbols 600 are arranged in the same order as their corresponding pictographs 500 as depicted in FIG. 5.

In illustration, the symbols 602, 604, 606, 608, 610 can correspond to the respective pictographs 502, 504, 506, 508, 510. For example, the symbol 602 can represent the apple depicted in the pictograph 502, and thus represent the unique speech sound "a" as pronounced in the word "apple." The symbol 604 can represent the awl depicted in the pictograph 504, and thus represent the unique speech sound "a" as pronounced in the word "awl." The symbol 606 can represent the boot depicted in the pictograph 506, and thus can represent the unique speech sound "b" as pronounced in the word "boot." The symbol 608 can represent the duck depicted in the pictograph 508, and thus can represent the unique speech sound "d" as pronounced in the word "duck." The symbol 610 can represent the church depicted in the pictograph 510, and thus can represent the unique speech sound "ch" as pronounced in the word "church," and so on.

One or more of the symbols 600 can include at least one visual attribute corresponding to a visual attribute of at least one respective letter of the text based language corresponding to the same unique speech sound to which the symbol 600 corresponds. Further, one or more symbols 600 can include at least one visual attribute corresponding to visual attribute of a respective pictograph 500 corresponding to the same unique speech sound to which the symbol 600 corresponds. For example, the symbol 606 can include a right lower portion 612 that corresponds to the right lower portion of the letter "b" and the lower portion 512 of the boot depicted in the pictograph 506. Further, the symbol 606 can include a left linear portion 614 corresponding to the left linear portion of the letter "b" and the shaft 514 of the boot depicted in the pictograph 506.

For illustrative purposes, the name of each entity or action represented by the respective symbols 600 is listed under the symbols 600. These names are not components of the symbols 600, however, but are merely provided to aid understanding of the description presented herein. In other words, the symbols 600 can be rendered as previously described without a requirement that the actual names of the entities be listed.

Further, several of the symbols 600 can include an attribute presented within the symbols 600 to represent a particular feature depicted in a respective pictograph 500, thereby facilitating recognition of the symbol 600 and the symbol's correlation to a respective pictograph 500 by the reader. For example, one or more of the symbols 600 can include a dot. In the symbol 606, the dot 616 can represent the spur on the boot depicted in the pictograph 506. In the symbol 608, the dot 618 can represent the duck's head as depicted in the pictograph 508. For illustrative purposes, underneath the name of each symbol 500 that includes a dot is an identification of the features of the respective pictographs 500 to which the dots correspond. Such identifications are not a component of the symbols 500, but merely provided to aid understanding of the description presented herein.

When a person, such as a child, begins to learn to read, the pictographs 500 can be presented as the phonetic objects to form the phonetic word objects previously discussed. The person's reading ability can be tracked or monitored. For example, the person's reading level can be identified. While the person's reading level is below a threshold value, the pictographs 500 can continue to be used as the phonetic objects. When the person's reading level at least equals the threshold value, in lieu of the pictographs 500, the symbols 600 can be used as the phonetic objects. To the reader, the symbols 600 visually may look more like the letters of the text based language than the pictographs 500, while still having a visual correlation to the pictographs 500. Thus, transitioning from use of the pictographs to use of the symbols 600 in the reading learning process can facilitate the eventual transition to reading text comprising letters.

Figure 7:
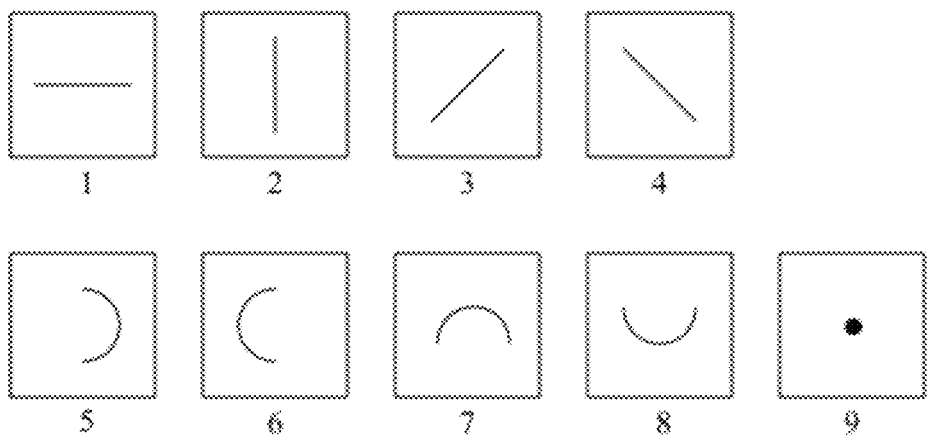
FIG. 7 depicts a group of visual attributes that are useful for understanding the present invention.

FIG. 7 depicts a group of visual attributes 700 that are useful for understanding the present invention. The group of visual attributes 700 can include visual attributes 1, 2, 3, 4, 5, 6, 7, 8, 9. The visual attributes 1-9 can be visual attributes that can be used to form certain ones of the symbols 600, for example symbols 600 representing consonants. In this regard, each symbol 600 representing a consonant can be formed using one or more of the visual attributes 1-9. The visual attribute 9 is the "dot" previously described.

A table 702 is provided to indicate entities/actions represented by the symbols 600, which correspond to the respective pictographs 500, the alphabet letter to which the symbols 600 correspond, and the visual attributes 1-9 used to form the symbols 600. For certain symbols 600, a particular attribute 1-9 can be used more than once. Further, the table 702 indicates the respective order in which the visual attributes can be combined, proceeding from left to right.

Figure 8:
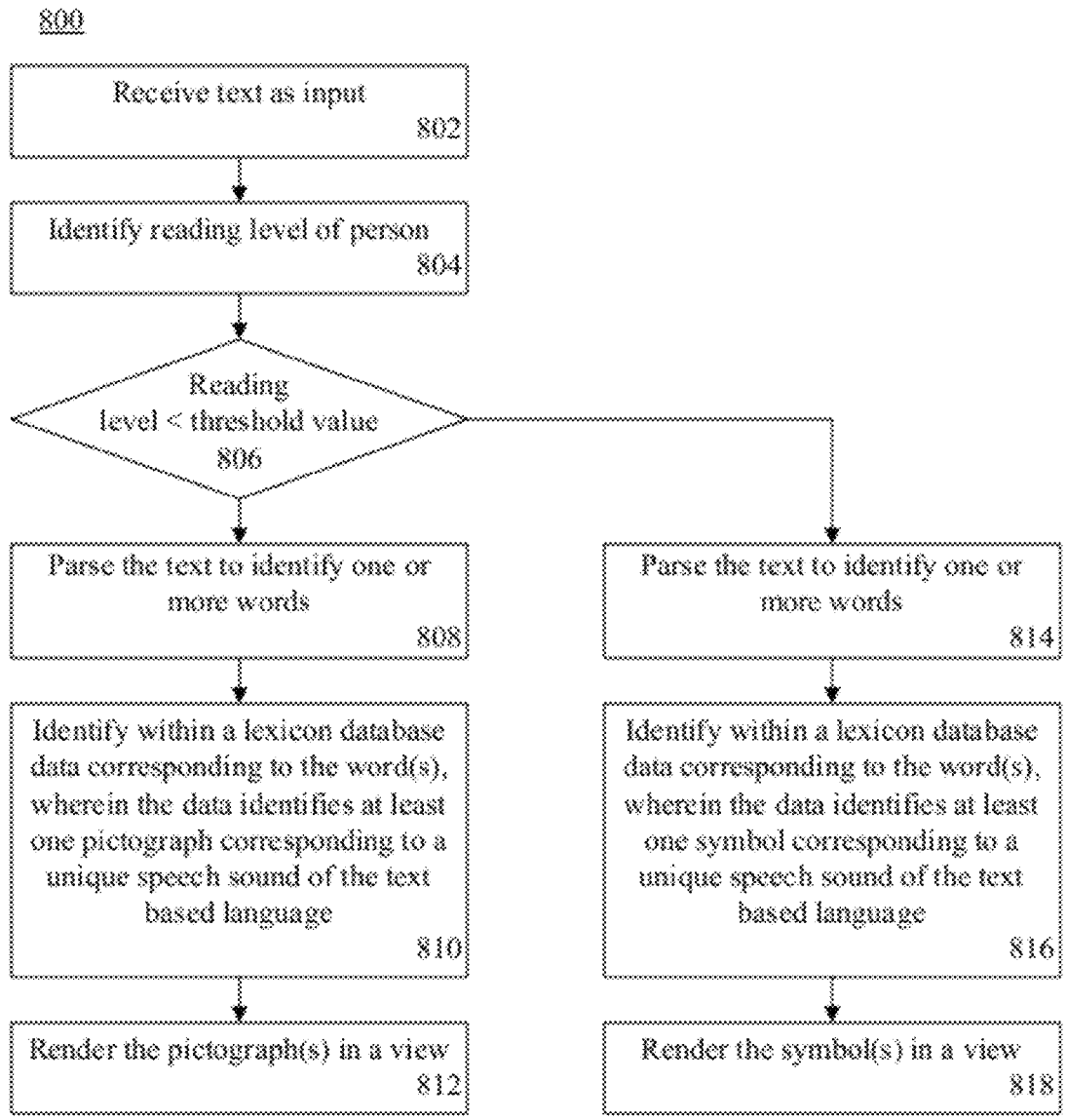
FIG. 8 depicts a flowchart illustrating a method of converting alphabetic text written in a text based language into a non-text based language that is useful for understanding the present invention.

FIG. 8 depicts a flowchart illustrating a method 800 of converting alphabetic text written in a text based language into a non-text based language that is useful for understanding the present invention. The non-text based language can be a pictograph based language or a symbol based language, depending on a person's reading level, as will be described.

At step 802, text can be received as an input. The input can be received in any suitable manner, for example as previously described with respect to FIG. 1. At step 804, a reading level of a person can be identified. For example, a user can be prompted to enter the person's reading level, the reading level can be determined based upon a number of reading sessions completed, the reading level can be determined by an amount of time it takes a reader to complete one or more reading sessions, the reading level can be determined based on a reading comprehension assessment performed on the person, or the reading level can be identified in any other suitable manner.

At decision box 806, a determination can be made as to whether the person's reading level is below a threshold value. If the reading level is below the threshold value, at step 808 the text can be parsed to identify one or more words. At step 810, via a processor, data corresponding to the word can be identified within a lexicon database. The data corresponding to the word can identify at least one pictograph selected from a group of pictographs that visually look different than the text, wherein each pictograph in the group of pictographs corresponds to a unique speech sound of the text based language. At step 812, the one or more pictographs can be rendered, for example on a display or on a printout generated by a printer. In illustration, the pictographs can be presented within phonetic word objects, such as those previously described. Moreover, letter word objects corresponding to the text-based language also can be rendered in proximity to the phonetic word objects to indicate corresponding relationships, for example as previously described, though this need not be case. For example, the phonetic word objects can be presented without the letter word objects.

Referring again to decision box 806, if the reading level of the person at least equals the threshold value, at step 814 the text can be parsed to identify one or more words. At step 816, via the processor, data corresponding to the word can be identified within the lexicon database. The data corresponding to the word can identify at least one symbol selected from a group of symbols that visually look different than the text, wherein each symbol in the group of symbols corresponds to a unique speech sound of the text based language. At step 818, the one or more symbols can be rendered, for example on a display or on a printout generated by a printer. In illustration, the symbols can be presented within phonetic word objects, such as those previously described. Again, letter word objects corresponding to the text-based language also can be rendered in proximity to the phonetic word objects to indicate corresponding relationships, for example as previously described, though this need not be case. As noted, the phonetic word objects can be presented without the letter word objects.

Like numbers have been used to refer to the same items throughout this specification. The flowchart and block diagram in the Figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustrations, and combinations of blocks in the block diagram and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automatically converting alphabetic text written in a text based language into a non-text based language, comprising:

identifying a reading level of a person;

when the identified reading level of the person is below a threshold level:

parsing the text to identify at least one word;

via a processor, identifying within a lexicon database data corresponding to the word, wherein the data corresponding to the word identifies at least one pictograph for each letter or plurality of letters of the word, the at least one pictograph being selected from a group of pictographs that visually look different than the text and comprises an object entity or an action, wherein each pictograph in the group of pictographs corresponds to a unique speech sound of the text based language;

rendering the identified at least one word as a phonetic word object in a view, the phonetic word object including the identified at least one pictograph; and monitoring the reading level of the person;

when the identified reading level or monitored reading level of the person is at least equal to the threshold level:
parsing the text to identify at least one word;
via the processor, identifying within the lexicon database data corresponding to the word, wherein the data corresponding to the word identifies at least one symbol for each letter or plurality of letters of the word, the at least one symbol being selected from a group of symbols that visually look more like the letters of the text based language than the pictographs, wherein the group of symbols comprises at least one symbol representing a consonant that has at least one visual attribute representing a particular feature depicted in a corresponding pictograph, wherein each symbol in the group of symbols corresponds to a unique speech sound of the text based language; and
rendering the identified at least one word as a phonetic word object in a view, the phonetic word object including the identified at least one symbol.

2. The method of claim 1, wherein:
the group of pictographs consists of between twenty seven and thirty three distinct pictographs; and
the group of symbols consists of between twenty seven and thirty three distinct symbols.

3. The method of claim 2, wherein:
the group of pictographs consists of between seventeen and nineteen pictographs that correspond to consonant speech sounds; and
the group of symbols consists of between seventeen and nineteen symbols that correspond to consonant speech sounds.

4. The method of claim 1, wherein:
at least one of the pictographs includes at least one visual attribute corresponding to a visual attribute of at least one respective letter of the text based language corresponding to the same unique speech sound to which the pictograph corresponds; and
the at least one of the pictograph includes at least one visual attribute corresponding to visual attribute of a respective symbol in the group of symbols corresponding to the same unique speech sound to which the pictograph corresponds.

5. The method of claim 1, wherein each of the symbols that correspond to consonant speech sounds comprise at least one visual attribute, wherein the at least one visual attribute is selected from a group of visual attributes of nine distinct visual attributes.

6. The method of claim 5, wherein:
the visual attribute for at least one symbol in the group of symbols includes a dot, wherein the dot corresponds to a feature depicted in a pictograph contained in a group of pictographs, the pictographs corresponds to a same consonant sound as the symbol.

7. The method of claim 1, wherein:
at least one of the respective symbols in the group of symbols include at least one visual attribute corresponding to a visual attribute of at least one respective letter of the text based language corresponding to the same unique speech sound to which the symbol corresponds; and
the at least one symbol includes at least one visual attribute corresponding to visual attribute of a respective pictographs in a group of pictographs corresponding to the same unique speech sound to which the symbol corresponds.

8. The method of claim 1, wherein the at least one visual attribute representing a particular feature depicted in a corresponding pictograph includes a dot.

9. A non-transitory computer program product for converting alphabetic text written in a text based language into a non-text based language, the computer program product comprising:
a computer-readable storage device having computer-readable program code embodied therewith, the computer-readable program code comprising:
computer-readable program code configured to identify a reading level of a person;
computer-readable program code configured to, when the identified reading level of the person is below a threshold level:
parse the text to identify at least one word;
identify within a lexicon database data corresponding to the word, wherein the data corresponding to the word identifies at least one pictograph for each letter or plurality of letters of the word, the at least one pictograph being selected from a group of pictographs that visually look different than the text and comprises an object entity or an action, wherein each pictograph in the group of pictographs corresponds to a unique speech sound of the text based language;
render the identified at least one word as a phonetic word object in a view, the phonetic word object including the identified at least one pictograph; and
monitor the reading level of the person;
computer-readable program code configured to, when the identified reading level or monitored reading level of the person is at least equal to the threshold level:
parse the text to identify at least one word;
identify within the lexicon database data corresponding to the word, wherein the data corresponding to the word identifies at least one symbol for each letter or plurality of letters of the word, the at least one symbol being selected from a group of symbols that visually look more like the letters of the text based language than the pictographs, wherein the group of symbols comprises at least one symbol representing a consonant that has at least one visual attribute representing a particular feature depicted in a corresponding pictograph, wherein each symbol in the group of symbols corresponds to a unique speech sound of the text based language; and
render the identified at least one word as a phonetic word object in a view, the phonetic word object including the identified at least one symbol.

10. The computer program product of claim 9, wherein:
the group of pictographs consists of between twenty seven and thirty three distinct pictographs; and
the group of symbols consists of between twenty seven and thirty three distinct symbols.

11. The computer program product of claim 10, wherein:
the group of pictographs consists of between and nineteen pictographs that correspond to consonant speech sounds; and
the group of symbols consists of between seventeen and nineteen symbols that correspond to consonant speech sounds.

12. The computer program product of claim 9, wherein:
at least one of the pictographs includes at least one visual attribute corresponding to a visual attribute of at least one respective letter of the text based language corresponding to the same unique speech sound to which the pictograph corresponds; and the at least one of the pictograph includes at least one visual attribute corresponding to visual attribute of a respective symbol in the group of symbols corresponding to the same unique speech sound to which the pictograph corresponds.

13. The computer program product of claim 9, wherein each of the symbols that correspond to consonant speech sounds comprise at least one visual attribute, wherein the at least one visual attribute is selected from a group of visual attributes consisting of nine distinct visual attributes.

14. The computer program product of claim 13, wherein:
the visual attribute for at least one symbol in the group of symbols includes a dot, wherein the dot corresponds to a feature depicted in a pictograph contained in a group of pictographs, the pictograph corresponding to a same consonant sound as the symbol.

15. The computer program of claim of 9, wherein:
at least one of the respective symbols in the group of symbols includes at least one visual attribute corresponding to a visual attribute of at least one respective letter of the text based language corresponding to the same unique speech sound to which the symbol corresponds; and
the at least one symbol includes at least one visual attribute corresponding to the visual attribute of a respective pictograph in a group of pictographs corresponding to the same unique speech sound to which the symbol corresponds.

16. The computer program product of claim 9, wherein the at least one visual attribute representing a particular feature depicted in a corresponding pictograph includes a dot.

\* \* \* \* \*